US008833789B2

(12) United States Patent
Anderson

(10) Patent No.: US 8,833,789 B2
(45) Date of Patent: Sep. 16, 2014

(54) SWAY CONTROL HITCH

(75) Inventor: Jed K. Anderson, Lindon, UT (US)

(73) Assignee: Progress Mfg. Inc., Provo, UT (US)

( * ) Notice: Subject to any disclaimer, the term of this patent is extended or adjusted under 35 U.S.C. 154(b) by 611 days.

(21) Appl. No.: 11/895,289

(22) Filed: Aug. 23, 2007

(65) Prior Publication Data

US 2008/0122198 A1    May 29, 2008

Related U.S. Application Data

(60) Provisional application No. 60/861,622, filed on Nov. 27, 2006.

(51) Int. Cl.
*B60D 1/32* (2006.01)
*B62D 53/04* (2006.01)
*B60D 1/06* (2006.01)
*B60D 1/34* (2006.01)

(52) U.S. Cl.
CPC . *B60D 1/065* (2013.01); *B60D 1/34* (2013.01)
USPC ..................................... 280/455.1; 280/405.1

(58) Field of Classification Search
USPC ........ 280/455.1, 405.1, 406.1, 406.2; 29/258, 29/459, 460, 527.2, 527.6, 557, 558; 427/154, 156
See application file for complete search history.

(56) References Cited

U.S. PATENT DOCUMENTS

| | | | | |
|---|---|---|---|---|
| 2,715,034 A | * | 8/1955 | Cornwall | 280/406.2 |
| 2,808,272 A | * | 10/1957 | Reese | 280/406.2 |
| 2,952,475 A | | 9/1960 | Reese | |
| 3,185,499 A | | 5/1965 | Reese | |
| 3,194,584 A | * | 7/1965 | Reese | 280/406.2 |
| 3,206,224 A | | 9/1965 | Bock et al. | |
| 3,294,421 A | * | 12/1966 | Mathisen | 280/455.1 |
| 3,347,561 A | * | 10/1967 | Hedgepeth | 280/406.2 |
| 3,380,757 A | | 4/1968 | Sprout et al. | |
| 3,400,948 A | | 9/1968 | Matson | |
| 3,403,928 A | * | 10/1968 | Laughlin | 280/406.2 |
| 3,441,291 A | | 4/1969 | Morris, Jr. | |
| 3,520,556 A | * | 7/1970 | Warner | 280/406.2 |
| 3,542,394 A | | 11/1970 | Palage | |
| 3,542,395 A | * | 11/1970 | Millikan | 280/406.2 |
| 3,552,771 A | * | 1/1971 | Hendricks | 280/406.2 |
| 3,567,251 A | | 3/1971 | Dalton | |
| 3,600,004 A | * | 8/1971 | Newkirk | 280/156 |
| 3,730,554 A | * | 5/1973 | Saunders | 280/406.2 |

(Continued)

FOREIGN PATENT DOCUMENTS

WO    WO 2005040461 A1 *   5/2005

*Primary Examiner* — Joseph M Rocca
*Assistant Examiner* — Daniel Yeagley
(74) *Attorney, Agent, or Firm* — Clayton, Howarth & Cannon, P.C.

(57) ABSTRACT

A trailer hitch system for equalizing trailer loads and reducing trailer sway. The trailer hitch system may include spring bars that may be attached to a hitch head using a trunnion style connection. The spring bars may be attached to the trailer using rigid brackets that reduce swinging of the spring bars. The rigid brackets may include an upward extending portion for attaching to the trailer tongue, and a lateral extending portion for receiving the spring bars thereupon. The brackets may have a contact surface on the lateral extending portion that may be free from a coating such that a metal on metal contact is made between the spring bars and the brackets. Portions of the brackets beyond the contact surface may be covered with a protective coating.

80 Claims, 7 Drawing Sheets

(56) References Cited

U.S. PATENT DOCUMENTS

| | | | |
|---|---|---|---|
| 3,731,950 A * | 5/1973 | Burcham | 280/406.2 |
| 3,779,407 A * | 12/1973 | Gillem | 414/563 |
| 3,785,680 A | 1/1974 | Good et al. | |
| 3,801,133 A * | 4/1974 | Thompson | 280/406.2 |
| 3,861,717 A | 1/1975 | Knox | |
| 3,879,061 A * | 4/1975 | Thompson | 280/405.1 |
| 4,053,174 A * | 10/1977 | Guettler, Jr. | 280/406.2 |
| 4,165,885 A | 8/1979 | Good et al. | |
| 4,213,627 A * | 7/1980 | Thompson | 280/406.2 |
| 4,790,557 A * | 12/1988 | Klingler | 172/450 |
| 5,375,867 A | 12/1994 | Kass et al. | |
| 5,465,991 A | 11/1995 | Kass et al. | |
| 5,562,298 A | 10/1996 | Kass et al. | |
| 5,628,525 A * | 5/1997 | Kass et al. | 280/406.2 |
| 5,647,603 A * | 7/1997 | Kass et al. | 280/406.1 |
| D382,464 S * | 8/1997 | McCoy et al. | D8/373 |
| 5,799,965 A * | 9/1998 | Kass et al. | 280/406.1 |
| 5,868,414 A * | 2/1999 | McCoy et al. | 280/406.2 |
| 5,882,170 A * | 3/1999 | Walton | 414/462 |
| 5,890,726 A * | 4/1999 | McCoy et al. | 280/406.1 |
| 5,984,341 A * | 11/1999 | Kass et al. | 280/455.1 |
| 6,248,225 B1 * | 6/2001 | Palaika et al. | 204/484 |
| 6,283,489 B1 | 9/2001 | Hoog | |
| 6,419,257 B1 | 7/2002 | McCoy et al. | |
| 6,474,675 B1 | 11/2002 | Bockman et al. | |
| 6,485,046 B1 | 11/2002 | Hsueh et al. | |
| 6,722,682 B2 | 4/2004 | Valliere et al. | |
| 6,746,036 B2 | 6/2004 | Adams | |
| 7,025,370 B2 * | 4/2006 | Anderson et al. | 280/405.1 |
| 7,029,020 B2 | 4/2006 | Adams | |
| 2003/0042703 A1 | 3/2003 | Valliere et al. | |
| 2008/0143078 A1 * | 6/2008 | McCoy et al. | 280/406.1 |
| 2008/0238038 A1 * | 10/2008 | Anderson et al. | 280/504 |
| 2008/0277903 A1 * | 11/2008 | Anderson et al. | 280/477 |
| 2009/0008904 A1 * | 1/2009 | Scott | 280/455.1 |
| 2009/0017201 A1 * | 1/2009 | Schmidt et al. | 427/154 |
| 2009/0152832 A1 * | 6/2009 | Moore et al. | 280/455.1 |

* cited by examiner

SWAY CONTROL HITCH

CROSS-REFERENCE TO RELATED APPLICATIONS

This application claims the benefit of U.S. Provisional Application No. 60/861,622 filed Nov. 27, 2006, which is hereby incorporated by reference herein in its entirety, including but not limited to those portions that specifically appear hereinafter, the incorporation by reference being made with the following exception: In the event that any portion of the above-referenced provisional application is inconsistent with this application, this application supercedes said above-referenced provisional application.

STATEMENT REGARDING FEDERALLY SPONSORED RESEARCH OR DEVELOPMENT

Not Applicable.

BACKGROUND

1. The Field of the Invention

The present disclosure relates generally to trailer hitch systems, and more particularly, but not necessarily entirely, to trailer hitch systems for reducing trailer sway.

2. Description of Related Art

Various different types of trailer hitches are known in the art for attaching trailers to towing vehicles. One of the most common types of towing systems utilizes a ball hitch. Typical ball hitches have a generally spherical shaped ball with a stem or threaded rod extending from a base of the ball. The threaded rod may be configured to engage a hitch head mounted on the towing vehicle using a threaded receiver or ball hitch fitting. A trailer coupling member, positioned on a front of the trailer tongue, may engage the ball hitch in a loose friction fit, and may be secured to the ball in preparation for towing.

One of the biggest safety concerns with towing trailers is that the trailers may sway, leading to loss of control of the towing vehicle. A number of factors may contribute to sway, including: side winds, passing vehicles, quick lane changes, uneven roads and sudden stops. Some trailer hitches may not handle these situations well and may often exacerbate the sway problem making driving even more stressful and difficult.

Another common problem encountered when towing a trailer is "highway hop," or the bouncing that often happens to trailers on uneven roadways. This problem may be caused by uneven weight distribution. With ordinary ball-type hitches, most of the trailer tongue weight may be carried on the back axle of the tow vehicle. This may raise the front end of the tow vehicle. The uneven distribution of weight may make steering control more difficult, especially during emergency situations. Weight distribution allows a trailer and tow vehicle to be level. Risks associated with driving a trailer without a weight distribution hitch may include loss of steering control, braking difficulties, and hitch dragging.

Some hitches include load equalizing systems utilizing spring arms or bars to distribute loads and allow the towing vehicle and trailer to remain level. One end of the spring arms may be attached under the ball hitch and hitch head. The spring arms may extend from the hitch head towards the trailer, and may be joined to the trailer tongue using chains and/or brackets. The end of the spring arms opposite the hitch head may be lifted or loaded to place an upward force on the hitch head to thereby equalize the load exerted on the trailer hitch. Various mechanisms are known for use in association with a trailer hitch to reduce side sway of the trailer as well as to equalize loads.

Some prior art embodiments of the brackets for joining the spring bars to the trailer tongue have been formed as rigid members, whereas other embodiments of the brackets have been formed as flexible members, such as chains. A drawback of the prior art brackets formed as flexible members is that the flexible members or chains may not provide stabilizing support to the spring bars and may allow the spring bars to swing back and forth like a pendulum.

Other prior art embodiments of brackets used for joining the spring bars to the trailer tongues include a convex cam surface on the bracket that interacts with a corresponding concave shape, or cam follower, on the spring bars. The shape of the cam surface on the bracket with respect to the cam follower on the spring bar may be configured to bias the spring bar in a neutral position with respect to the bracket, in which the cam follower mates with the cam. As the spring bar moves away from the neutral position in which the cam and cam follower are mated, the biasing force caused by the shapes of the cam and the cam follower tends to move the spring bar back to the mated position on the bracket to thereby add stability to the trailer hitch system. Brackets having convex cam surfaces are disclosed in U.S. Pat. No. 3,194,584, U.S. Pat. No. 3,730,554 and U.S. Pat. No. 6,419,257, for example.

Despite the advantages of the known trailer hitches, improvements are still being sought. The prior art is characterized by several disadvantages that may be addressed by the present disclosure. The present disclosure minimizes, and in some aspects eliminates, the failures of the prior art, by utilizing the methods and structural features described herein.

The features and advantages of the disclosure will be set forth in the description which follows, and in part will be apparent from the description, or may be learned by the practice of the disclosure without undue experimentation. The features and advantages of the disclosure may be realized and obtained by means of the instruments and combinations particularly pointed out in the appended claims.

BRIEF DESCRIPTION OF THE DRAWINGS

The features and advantages of the disclosure will become apparent from a consideration of the subsequent detailed description presented in connection with the accompanying drawings in which.

DETAILED DESCRIPTION

Figure 1:
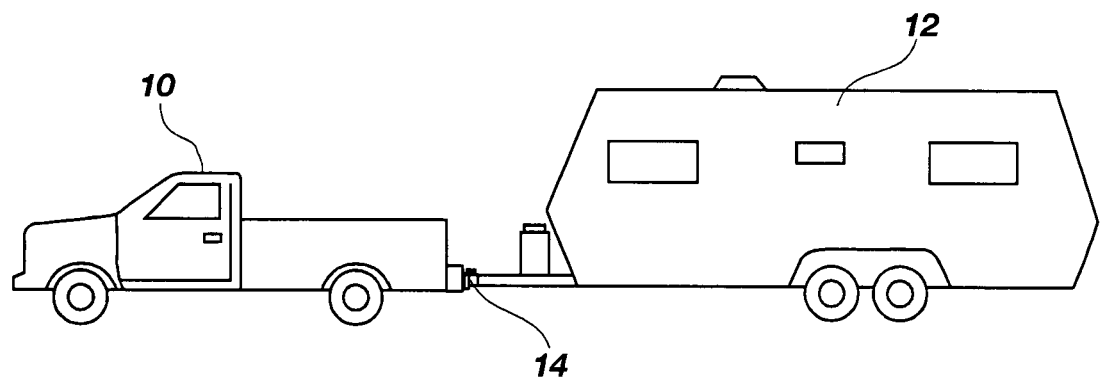
FIG. 1 is a side view of tow vehicle towing a trailer using a trailer hitch.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

Before the present structures and methods for providing a sway control hitch are disclosed and described, it is to be understood that this disclosure is not limited to the particular configurations, process steps, and materials disclosed herein as such configurations, process steps, and materials may vary somewhat. It is also to be understood that the terminology employed herein is used for the purpose of describing particular embodiments only and is not intended to be limiting since the scope of the present disclosure will be limited only by the appended claims and equivalents thereof.

The publications and other reference materials referred to herein to describe the background of the disclosure, and to provide additional detail regarding its practice, are hereby incorporated by reference herein in their entireties, with the following exception: In the event that any portion of said reference materials is inconsistent with this application, this application supercedes said reference materials. The reference materials discussed herein are provided solely for their disclosure prior to the filing date of the present application. Nothing herein is to be construed as a suggestion or admission that the inventors are not entitled to antedate such disclosure by virtue of prior disclosure, or to distinguish the present disclosure from the subject matter disclosed in the reference materials.

It must be noted that, as used in this specification and the appended claims, the singular forms "a," "an," and "the" include plural referents unless the context clearly dictates otherwise. Moreover, as used herein, the terms "comprising," "including," "containing," "characterized by," and grammatical equivalents thereof are inclusive or open-ended terms that do not exclude additional, unrecited elements or method steps.

As used herein, the term "rigid" shall be construed broadly in accordance with its ordinary meaning to include members that are substantially stiff, firm, or inflexible. For example, a chain may not be considered to be a rigid member, even though individual links of the chain may be rigid, since the chain as a whole is flexible.

Referring now to FIG. 1, a side view is shown of a towing vehicle 10 towing a trailer 12 with a trailer hitch 14. It will be understood that the towing vehicle 10 may be any variety of vehicle known in the art, such as a truck, tractor or car, or any other variety of on-road or off-road vehicle, for example. Likewise, the principles of the present disclosure may be utilized with any variety of trailer 12 known in the art, such as camping trailers, boat trailers or cargo trailers, for example.

As is known in the art, the load from the trailer 12 may force the rear end of the towing vehicle 10 down and raise the front end of the towing vehicle 10. The uneven distribution of weight may make steering the towing vehicle 10 more difficult and may cause braking difficulties or the prior art hitches to drag on the ground. Load equalizing systems, as discussed more fully below, may be used to distribute the load created by the trailer 12 on the towing vehicle 10 to thereby make the trailer 12 and towing vehicle 10 more level, as shown in FIG. 1.

Figure 2:
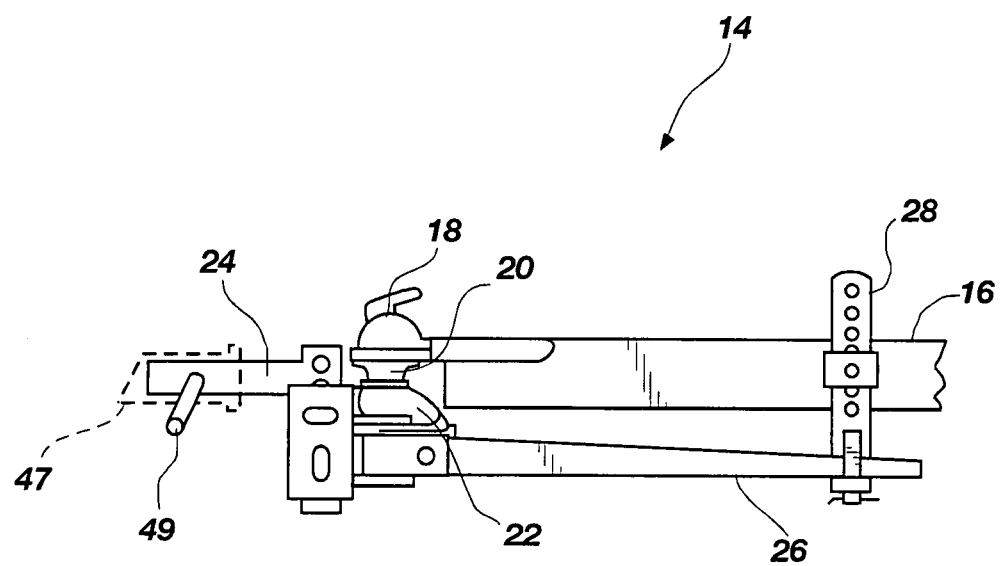
FIG. 2 is a side view of one embodiment of a trailer hitch attached to a break-away portion of a trailer tongue.

As shown in FIG. 2, which shows an enlarged view of the hitch 14 on a break-away view of the trailer 12, the trailer 12 may include a tongue 16 extending at a forward end of the trailer 12. A coupler 18 may be located on an end of the tongue 16 for receiving a ball 20 of the hitch 14, in a manner known in the art. The ball 20 may be disposed on a hitch head 22 which may be attached to the tow vehicle 10 through a connector 24. A spring bar 26 may be joined to the hitch head 22 at one end, and to the trailer tongue 16 at an opposing end portion using a bracket 28. It will be understood that two spring bars 26 may be used, one on each side of the trailer 12.

The spring bars 26 may be configured to provide an upward force on the hitch head 22 to equalize the distribution of the load and allow the towing vehicle 10 and trailer 12 to be more level. The spring bars 26 may also be beneficial for reducing sway of the trailer 12.

Figure 3:
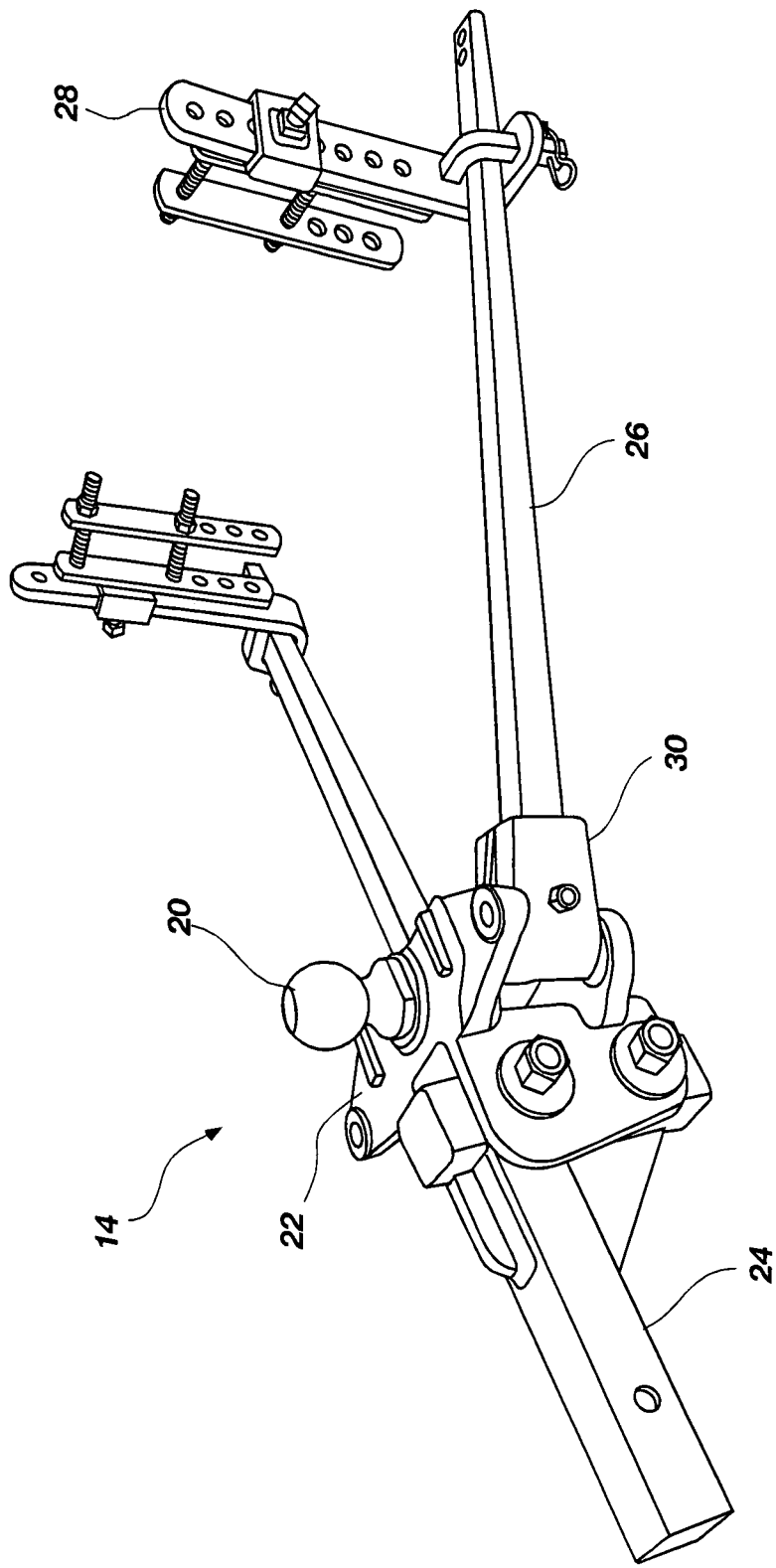
FIG. 3 is a perspective view of a trailer hitch in accordance with the principles of the present disclosure.

Referring now to FIG. 3, a perspective view is shown of one embodiment of the hitch system, indicated generally at 14, in accordance with the principles of the present disclosure. It will be understood that the hitch system 14 may be attached to the tow vehicle 10 and trailer 12 as shown in FIG. 1. The hitch 14 may include the hitch head 22 for receiving the ball 20. It will be understood that the ball 20 may be attached to a trailer 12 in a manner known in the art. Similarly, the hitch 14 may include a connector 24 for attachment to a tow vehicle 10.

The hitch 14 may include spring bars 26 for applying an upward force on the hitch head 22 as discussed above. It will be understood that the spring bars 26 may be formed in various different configurations in accordance with the principles of the present disclosure. For example, one embodiment of the spring bars 26 may be formed of elongate members having a rectangular cross-sectional shape. The spring bars 26 may have various different configurations. For example, the spring bar 26 may have a tapered configuration such that the cross sectional area of the spring bars 26 may reduce along a length of the bars. Alternatively, as discussed more fully below with reference to FIGS. 7-9, the spring bars may have a uniform, non-tapering configuration. An additional embodiment of the spring bars may be formed with a round cross-sectional shape. Moreover, it will be appreciated that the spring bars may have various other configurations within the scope of the present disclosure.

Figure 4:
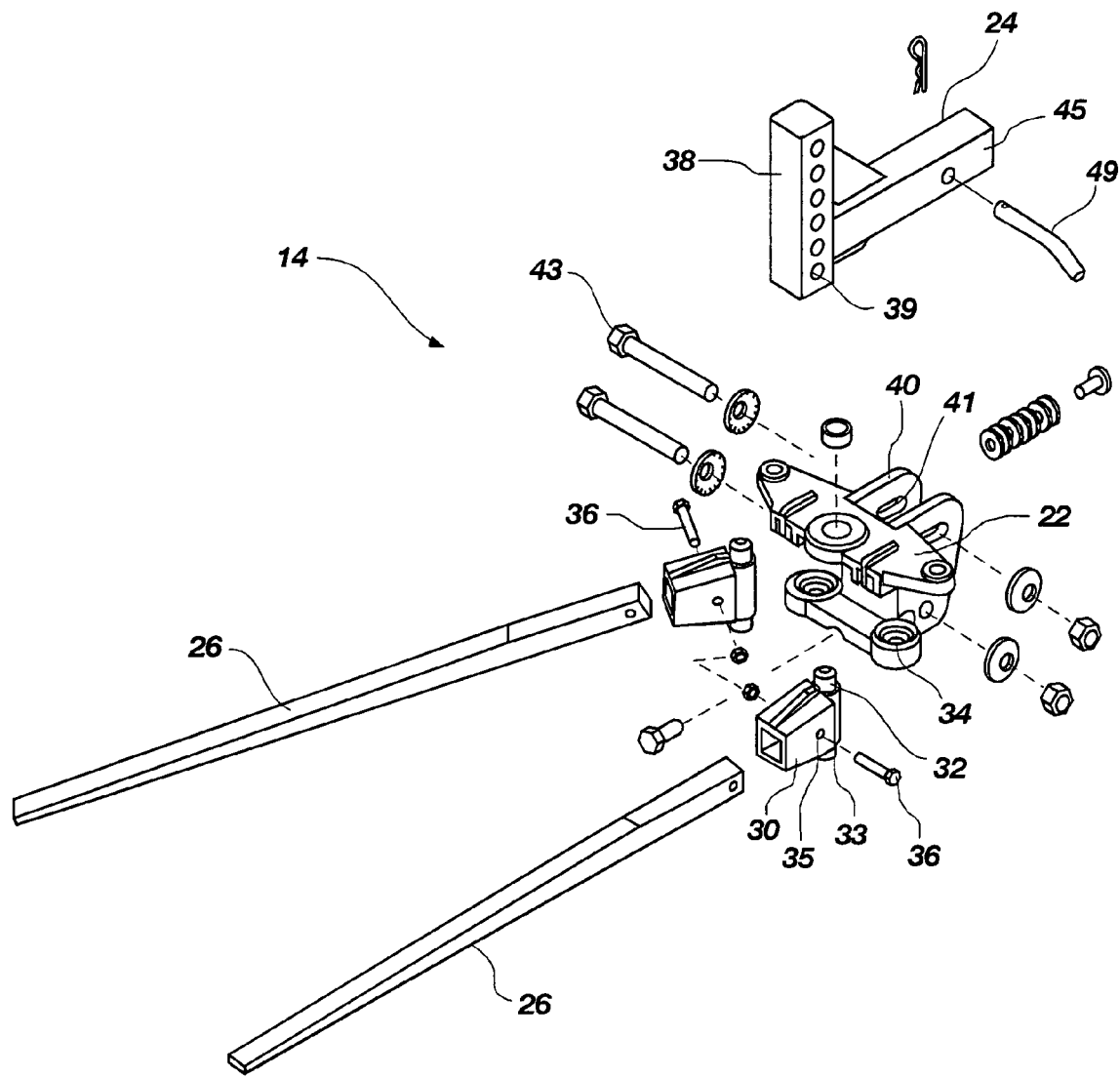
FIG. 4 is an exploded perspective view of a trailer hitch.

In one embodiment of the present disclosure, the spring bars 26 may be attached to the hitch head 22 through sleeves 30, as shown most clearly in FIG. 4, which shows an exploded view of the hitch system 14, without the brackets 28. The sleeves 30 may include projections 32 that may be received in receptacles 34 in the hitch head 22 such that the sleeves 30 may be allowed to pivot and rotate with respect to the hitch head 22 at the projections 32. Accordingly, the spring bars 26 may be attached to the hitch head 22 through a trunnion connection. The projections 32 may be fixed and non-rotatable with respect to the sleeve 30 and the spring bars 26 may be received within the sleeves 30 to be joined to the sleeves 30. One embodiment of the present disclosure may include openings 35 in the sleeves 30 and the spring bars 26 for receiving a fastener 36 for joining the spring bars 26 to the sleeves 30. The fastener 36 may be formed as a bolt, pin, screw, clip or the like for fastening the spring bars 26 to the sleeves 30. It will be understood, however, that the spring bars 26 may be joined to the sleeves 30 using various different mechanisms known to those skilled in the art.

One embodiment of the present disclosure may include the spring bars 26 each having a first projection 32 on a first side of the spring bar 26, and a second projection 33 on a second, opposite side of the spring bar 26. The first projection 32 and the second projection 33 being non-rotatably joined to the spring bar 26 and configured for attaching the spring bar 26 to the hitch head 22.

It will be understood that as used herein, reference to the phrase "non-rotatably joined," such as the projections 32 being "non-rotatably joined" to the spring bar 26, refers to the condition in which one structure does not rotate with respect to the other. For example, the embodiment of the projections 32 in which the projections 32 do not rotate with respect to the spring bar 26. The projections 32 may, however, rotate with respect to the hitch head 22 in such configurations.

It will be understood that an alternative embodiment of the present disclosure may include the projections 32, 33 disposed on the spring bars without a sleeve such that the spring bars and projections 32, 33 may be formed as a one-piece unitary member. Alternatively, the sleeves 30 may be welded or otherwise permanently joined to the spring bars 26.

One embodiment of the sleeves 30 may be pivotally joined to the hitch head 22 such that top and bottom surfaces of the sleeve 30 do not frictionally engage the hitch head to thereby allow the sleeve 30 and spring bar 26 to pivot more freely with respect to the hitch head 22. Alternative embodiments of the sleeves 30 may be configured to engage the hitch head 22 to provide resistance to movement of the sleeve 30 with respect to the hitch head 22.

One embodiment of the hitch system 14 may be adjustably attached to the tow vehicle 10 through the connector 24. The connector 24 may include a connecting portion 38 that may be received between a pair of flanges 40 on the hitch head 22. It will be understood that alternative embodiments may include different attachment structures in addition to or instead of the flanges 40. For example, the hitch head 22 may include a single flange, a socket, or any other suitable structure for attaching to the connector 24.

The connecting portion 38 may have a plurality of openings 39 that may be aligned with corresponding flange openings 41 in the flanges 40. One or more fasteners 43 may then be inserted through the flange openings 41 and the connecting portion openings 39 to join the connector 24 to the hitch head 22. It will be appreciated that the fasteners 43 may be formed as bolts or any other suitable connecting mechanism. Moreover, it will be understood that the connector 24 may be raised or lowered to align the desired connecting portion openings 39 with the flange openings 41 such that a height of an arm portion 45 of the connector 24 may thereby be adjusted. The connector 24 may be attached to the tow vehicle 10 by joining the arm portion 45 to a receiver 47, as shown in dashed lines in FIG. 2. The arm portion 45 may be joined to the receiver 47 using a pin 49, or other suitable attachment device.

Figure 5:
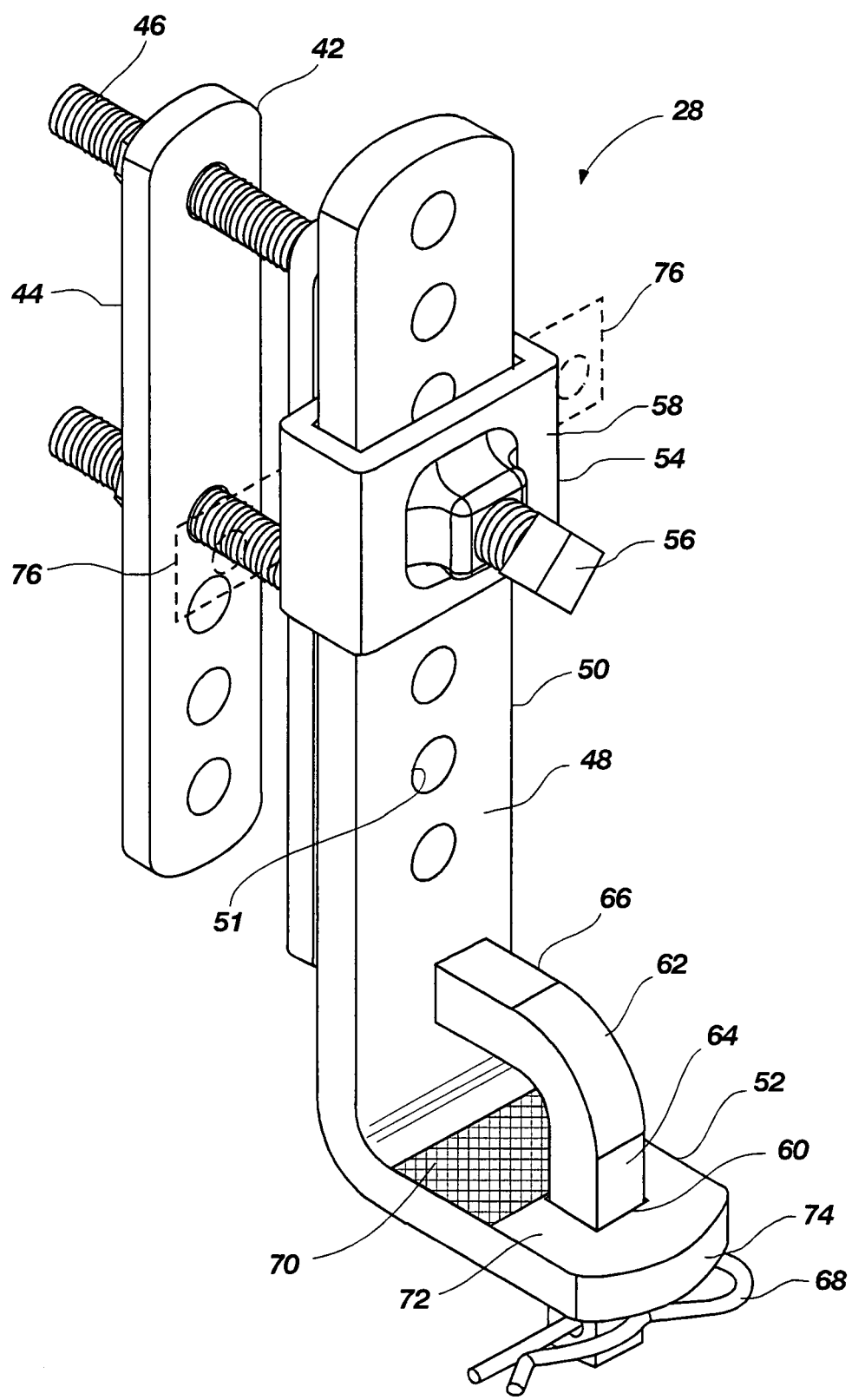
FIG. 5 is a perspective view of a bracket for joining a spring bar to the trailer tongue.

Brackets 28 may be provided to join the spring bars 26 to the trailer tongue 16, as shown most clearly in FIGS. 2 and 3. A perspective view of one embodiment of the brackets 28 is shown in FIG. 5. The brackets 28 may include an attachment portion 42 comprising a fastening mechanism for attaching the brackets 28 to the trailer tongue 16. The attachment portion 42 may include one or more attachment members 44 and one or more fasteners 46 for joining the attachment members 44 to the trailer tongue 16. The attachment members 44 may be formed as bars or plates, for example, or any other suitable shaped structure. It will be understood that one embodiment of the present disclosure may include two fasteners 46 that may be configured and arranged to extend on the top and bottom of the trailer tongue 16 to join the bracket 28 to the trailer tongue 16. Alternatively, the fasteners 46 may be received in openings in the trailer tongue 16 for joining the bracket 28 to the trailer tongue 16.

The bracket 28 may also include a support 48 for supporting the spring bar 26. One embodiment of the support 48 may be formed of a rigid member having a substantially "L" shaped configuration. The support may include an upward extending portion 50 for being attached to the attachment portion 42, and a lateral extending portion 52 for receiving the spring arm 26 thereupon. The upward extending portion 50 may include one or more openings 51 for adjustably attaching the support 48 with respect to the attachment portion 42 in an upward and downward direction. The bracket 28 may also include an adjustment mechanism 54 for use in combination with the openings 51 for adjusting a position of the support 48 with respect to the attachment portion 42, and holding the support 48 in place with respect to the attachment portion 42.

The adjustment mechanism 54 may include a fastening member 56, such as a bolt, rod, pin, clip, or any other suitable device, that may be receiveable in the openings 51, or otherwise connectable to allow the support 48 to be releasably joined to the attachment portion 42. The adjustment mechanism 54 may also include a support receiver 58 for receiving the upward extending portion 50 of the support 48 such that the support 48 may be moved with respect to the receiver 58 as the support 48 slides up and down in the receiver 58. One embodiment of the receiver 58 may be fixedly joined to the attachment portion 42 such that attachment of the support 48 to the receiver 58 may serve to fix the support 48 to the attachment portion 42. It will be understood that the fastening member 56 may be aligned with one of the openings 51 such that the fastening member 56 may be introduced into the opening 51. One embodiment of the present disclosure may include threads on the fastening member 56 and the receiver 58 such that the fastening member 56 may be rotated to move into and out of the openings 51. Moreover, the threads may serve to hold the fastening member 56 in place. It will be understood, however, that other embodiments of the present disclosure may be formed with alternative attachment mechanisms not utilizing threads.

One embodiment of the support 48 may include an opening 60 in the lateral extending portion 52. A stud 62 may be received in the opening 60 for holding the spring bar 26 on the lateral extending portion 52. One embodiment of the stud 62 may have a somewhat "L" shape, including a post 64 for being received in the opening 60, and a rail portion 66 for extending over an upper surface of the spring bar 26 to prevent the spring bar 26 from moving off of the lateral extending portion 52 of the support 48. The stud 62 may be secured to the support 48 using a clip 68 or any other suitable fastening mechanism. It will be understood that the stud 66 and the support 48 may surround the spring bar 26 to hold the spring bar 26 on the support 48.

One embodiment of the bracket 28 may include a contact surface 70 on the lateral extending portion 52 of the support 48, where the spring bar 26 may contact the support 48. It will be understood that as the to vehicle 10 tows the trailer 12, particularly during turning maneuvers, the spring bar 26 may move with respect to the bracket 28. A bottom surface of the spring bar 26 may slide along the lateral extending portion 52 of the support 48 at the contact surface 70 along the length of the spring bar 26. The friction between the spring bar 26 and the contact surface 70 may add to the stability of the hitch and prevent the hitch from swaying. However, some embodiments of spring bars 26 on brackets 28 may cause a shearing noise as the spring bars 26 move with respect to the brackets 28. Also, the friction between the spring bars 26 and the contact surface 70 may impact the maneuverability of the tow vehicle 10 and trailer 12. Accordingly, the frictional characteristics of the contact surface 70 may be important in certain embodiments.

One embodiment of the present disclosure may include brackets 28 that may be at least partially covered with a protective coating, such as a paint, enamel, powder, or other surface material known to those skilled in the art. The coating may be provided to protect the bracket 28 against weathering, corrosion, or wear, for example, to maintain the bracket 28 in a suitable functioning and appearing condition. In one embodiment of the present disclosure, the contact surface 70 may be free from such coating such that the material forming the bracket 28 may directly contact the spring bar 26. Such contact may form a direct metal on metal contact, such as steel on steel contact, for example. Accordingly, the contact surface 70 or first portion of the lateral extending portion 52 without the coating may have a first surface friction coefficient, and a second portion 72 of the lateral extending portion 52 where the coating is deposited may have a second, different surface friction coefficient. In one embodiment, the first surface friction coefficient may be greater than the second surface friction coefficient. Alternatively, in another embodiment, the first surface friction coefficient may be less than or equal to the second surface friction coefficient. It will be understood that the spring bar 26 and the bracket 28 may be formed of any suitable materials having desired friction coefficients.

In one embodiment of the present disclosure, the contact surface 70 may extend on the lateral extending portion 52 between the opening 60 and the upward extending portion 50. The lateral extending portion 52 may have a length from the upward extending portion 52 to a free end 74. In one embodiment of the lateral extending portion 52, the contact surface 70 may cover less than 90% of the length of the lateral extending portion 52, and more than 10% of the length of lateral extending portion. More specifically, in one embodiment of the lateral extending portion 52, the contact surface 70 may cover less than 75% of the length of the lateral extending portion 52, and more than 25% of the length of lateral extending portion.

It will be understood that one embodiment of the contact surface 70 may be formed by masking, covering or otherwise shielding, an area defining the contact surface 70. The coating may then be applied to portions of the bracket 28, including the support 48. The coating may be applied by spraying, brushing, dipping, or any other suitable method known in the art for placing a coating on a material. The masking may be removed such that the contact surface 70 may be characterized by an absence of coating.

Figure 6:
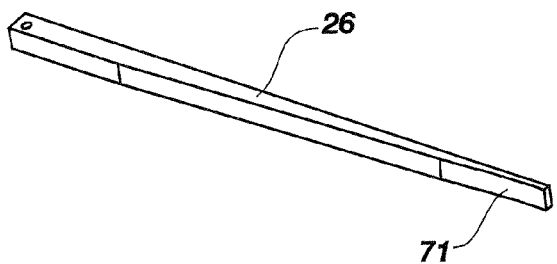
FIG. 6 is a bottom perspective view of one embodiment of a spring bar.

It will also be understood that one embodiment of the present disclosure may include the spring bar 26 having a coating disposed on an exterior surface thereof. As shown most clearly in FIG. 6, a bottom surface of the spring bar 26 may have a contact surface 71 that may be characterized by an absence of the coating such that the contact between the spring bar 26 and the contact surface 70 on the support 48 may be a direct metal on metal contact. It will be understood that the contact surface 71 on the spring bar 26 may be formed in a manner similar to the contact surface 70 on the lateral extending portion 52 of the support 48, as discussed above. It will also be understood that various different materials may be used to construct the spring bar 26 and support 48 such that various different coefficients of friction may be accomplished. Moreover, it will be understood that alternative embodiments of the present disclosure may include one or both of the contact surface 70 and the underside of the spring bar 26 having a coating thereon.

It will be understood that one useful method in accordance with the principles of the present disclosure may include: defining a contact surface 70, 71 on one of the spring bar 26 and the bracket 28; forming the contact surface 70, 71 by placing a covering over the one of the spring bar 26 and the bracket 28 at the contact surface 70, 71, applying a coating on the one of the spring bar 26 and the bracket 28, and removing the covering such that the contact surface 70, 71 is free from the coating.

An alternative embodiment of the present disclosure may include a bracket 28 having tabs 76, as shown in dashed lines in FIG. 5, for attaching the adjustment mechanism 54 to the trailer tongue 16. The tabs 76 may be provided in addition to or instead of the attachment portion 42. The tabs 76 may be formed in any suitable size and configuration, and may be attached to the trailer tongue 16 in any suitable manner known to those skilled in the art. For example, the tabs 76 may include openings for receiving fasteners, such as bolts or screws, for attaching the adjustment mechanism 54 to the trailer tongue 16. Alternatively, the tabs 76 or adjustment mechanism 54 itself may be welded to the trailer tongue 16.

It will be understood that one embodiment of the present disclosure may include the bracket 28 including the support 48 that may be rigid, as compared to flexible brackets such as chains that are sometimes used with hitch systems. It will be understood that chains may provide little or no sway control. Moreover, chains may even allow sway to increase once started, as the spring bars may swing like a pendulum. The rigid support 48 disclosed herein may be used to provide sway control and reduce swinging motions of the spring bars 26.

Additionally, chains are sometimes known to reduce maneuverability of the tow vehicle 10 and trailer 12 by restricting the turning radius of the tow vehicle 10, depending upon the length of the chain. Some situations with heavier trailer weights require the chains to be shortened to pull more tightly on the spring bars to transfer weight to equalize loads. Such short chains may restrict turning the tow vehicle 10 and may make backing the trailer 12 more difficult. In contrast, the principles of the present disclosure may be used to control sway without a loss of maneuverability.

Figure 7:
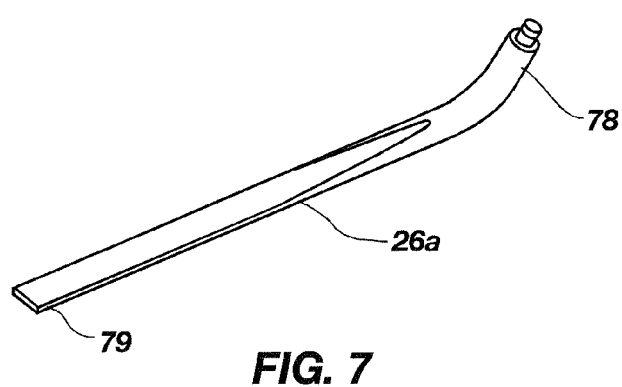
FIG. 7 is a perspective view of an alternative embodiment spring bar.
Figure 8:
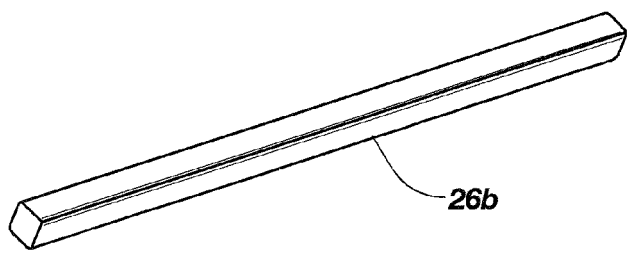
FIG. 8 is a perspective view of an additional alternative embodiment spring bar.
Figure 9:
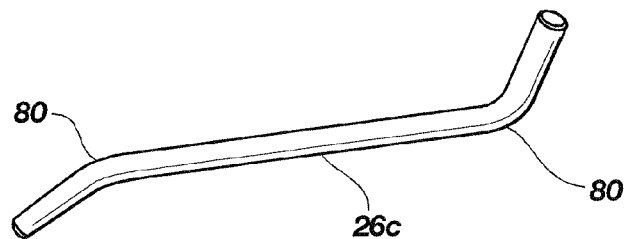
FIG. 9 is a perspective view of another alternative embodiment spring bar.

Referring now to FIGS. 7-9, additional embodiments of the spring bars are shown, as indicated by reference numeral 26a-26c, respectively. It will be understood that the spring bars indicated by reference numerals 26a-26c have many of the same features and uses as the spring bar 26 discussed above. However, some of the different characteristics will be discussed herein.

For example, the alternative embodiment spring bar 26a, shown in FIG. 7, may have a round cross-sectional shape at a first end portion 78, for attachment to the hitch head 22. The spring bar 26a may include a curve or bend toward the first end portion 78. The spring bar 26a may also taper toward a second end portion 79 at a location for attachment to the bracket 28. Accordingly, the cross-sectional shape at the second end portion 79 may be substantially rectangular.

Alternatively, as shown in FIG. 8, the spring bar 26b may have a substantially square cross-sectional configuration. The cross-sectional configuration of the spring bar 26b may be constant along a length of the spring bar 26b. It will be understood that the spring bar 26b may have various other constant cross-sectional configurations, such as round, oval, polygonal, or a combination curved and straight sided, or any other suitable configuration known in the art.

Another alternative embodiment spring bar 26c may include multiple bends, curves, or other non-linear configurations 80 such that the spring bar 26c may not extend in a straight, continuous direction. The spring bar 26c is shown having a round cross-sectional shape. However, it will be understood that the spring bar 26c may have any other suitable cross-sectional shapes as discussed above. Moreover, the spring bar 26c may have a tapered or uniform cross-sectional configuration.

One embodiment of the spring bar 26c may have a concave configuration that may correspond to a convex configuration, or cam, formed in the bracket. It will be understood that the spring bar 26c may interact with the cam surface to bias the spring bar 26c to a neutral position in which the spring bar 26c mates with a corresponding shape in the bracket. Accordingly, it will be understood that the shape of the spring bar 26c may be utilized to improve the stability of the trailer 12.

It will be understood that in use, the connector 24 may be attached to a receiver 47 on the tow vehicle 10, and the connector 24 may be secured in place using a pin 49. The hitch head 22 may be joined to the connector 24 such that the connector 24 may be received between the flanges 40. The hitch head 22 may be adjusted to the desired height and fastened in place by inserting fasteners 43 into the openings 41 in the flanges 40 and the openings 39 in the connector 24. The spring bars 26 may already be attached to the hitch head 22, or may be attached to the hitch head 22 at some other point in time.

The brackets 28 may be attached to the trailer tongue 16 by placing attachment members 44 on opposing sides of the tongue 16 and cinching the attachment members 44 to the tongue using fasteners 46. The supports 48 may be placed in a raised or lowered condition by removing the members 56 from the openings 51 in the supports 48 such that the supports 48 may slide in the receivers 58. Accordingly, the supports 48 may be adjusted to a desired height such that when the spring bars 26 are placed on the supports 48, the desired load may be applied to the hitch head 22.

The coupler 18 on the trailer 12 may be placed over the ball 20 to join the trailer 12 to the tow vehicle 10. The spring bars 26 may be in an unloaded condition extending beneath the supports 48. Accordingly, a lever may be placed on the lateral extending portion 52 of each support 48 and underneath a spring bar 26. The spring bar 26 may be loaded by lifting the lever to lift the spring bar 26 onto the lateral extending portion 52 of the support 48. As the spring bar 26 is lifted, an upward force may be placed on the hitch head 22 to thereby reduce the load placed on the rear end of the tow vehicle 10. Each spring bar 26 may be fastened to the bracket 28 by inserting a stud 62 into the opening 60 in the lateral extending portion 52 of the support 48. A clip 68 may be used to hold the stud 62 in place. The spring bar 26 may then reside on the contact surface 70 of the support 48. The spring bars 26 may move as the tow vehicle 10 turns such that the spring bars 26 slide along the contact surface 70 along the length of the spring bars 26 to create friction that may reduce sway of the trailer 12.

Figure 10:
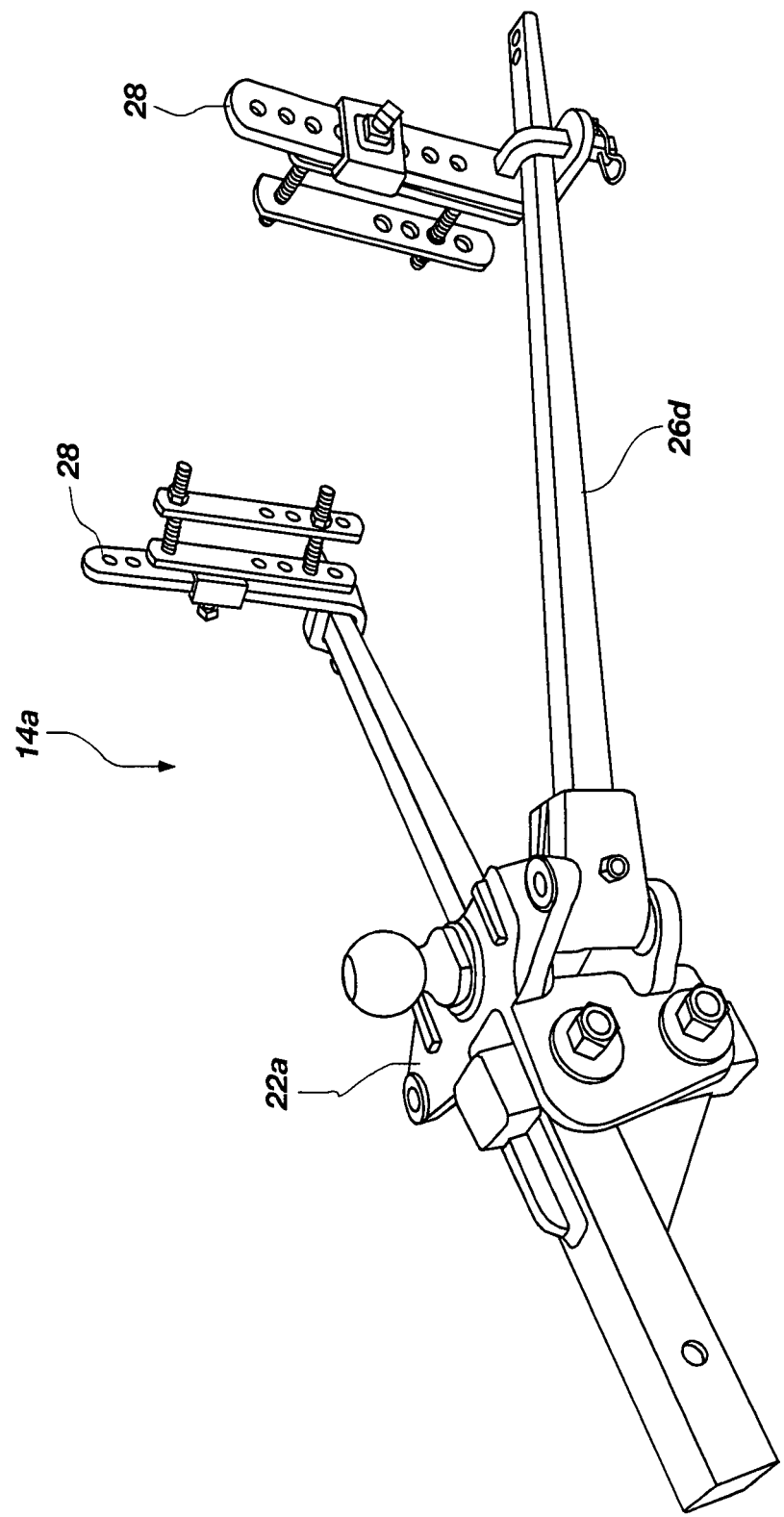
FIG. 10 is a perspective view of an alternative embodiment trailer hitch in accordance with the principles of the present disclosure.
Figure 11:
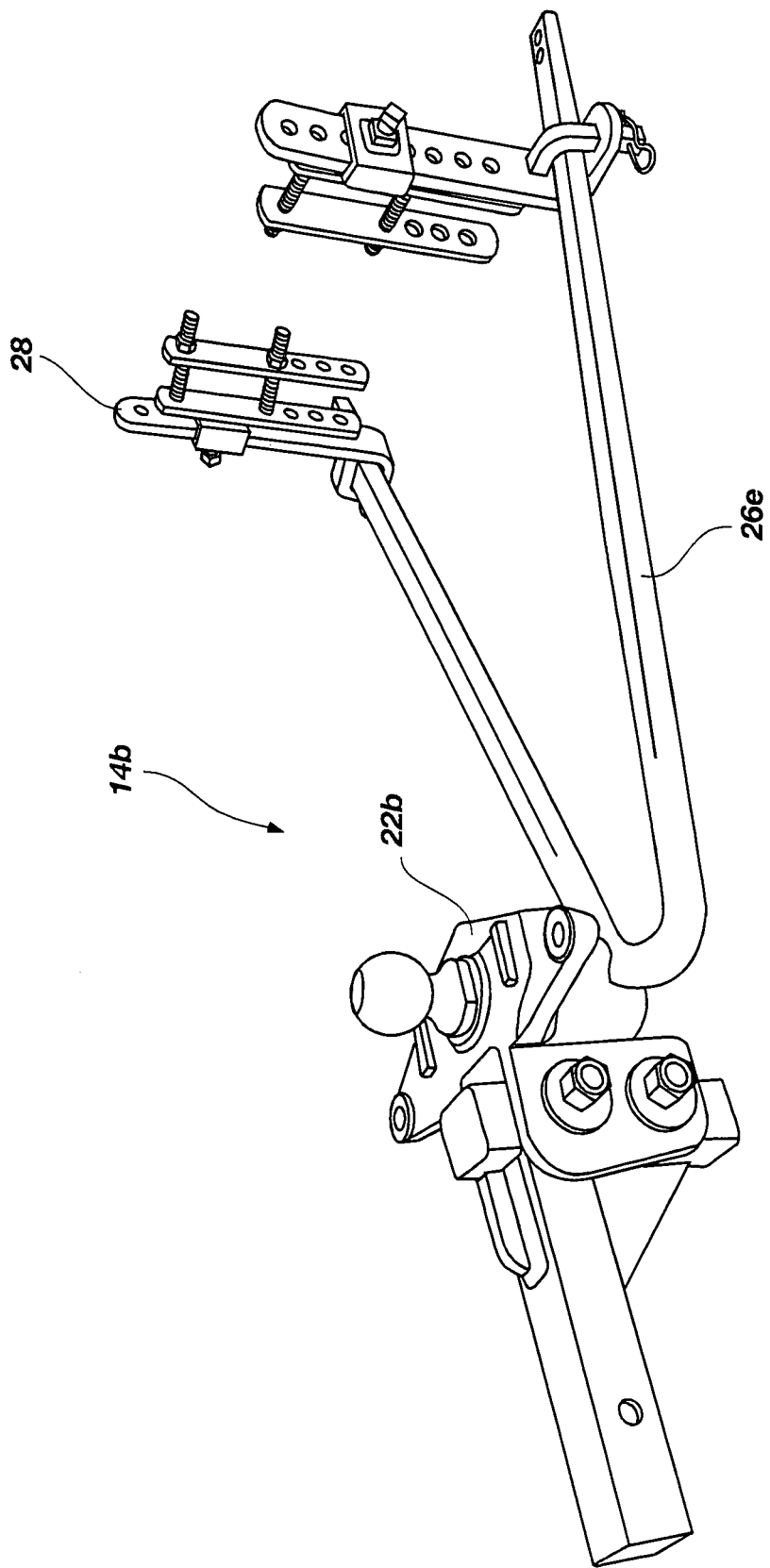
FIG. 11 is a perspective view of an additional alternative embodiment trailer hitch.

Referring now to FIGS. 10 and 11, alternative embodiment trailer hitches are shown. As previously discussed, the presently preferred embodiments of the disclosure illustrated herein are merely exemplary of the possible embodiments of the disclosure, including those illustrated in FIGS. 10 and 11.

It will be appreciated that the embodiments of the disclosure illustrated in FIGS. 10 and 11 contain many of the same structures represented in FIGS. 1-9. New or different structures will be explained to most succinctly describe the additional advantages that come with the embodiments of the disclosure illustrated in FIGS. 10 and 11.

FIG. 10 discloses an alternative embodiment trailer hitch 14a. The hitch 14a may include spring bars 26d having a substantially square cross-sectional shape. It will be understood that embodiments of the present disclosure may include spring bars of various configurations, including square cross-sectional shapes as depicted in FIG. 10, or rounded and tapered spring bars 26e, as depicted in the alternative embodiment hitch 14b in FIG. 11. Moreover, it will be understood that the hitch 14b may have a hitch head 22b configured to be compatible with the rounded spring bars 26e. The hitch 14b may also be used with brackets 28 as discussed above. Accordingly, it will be understood that various different combinations of hitch heads and spring bars may be useful with the brackets 18 within the scope of the present disclosure.

It will be understood that the structures disclosed herein may be manufactured using techniques and equipment known to those skilled in the art. For example, the components of the trailer hitch system may be formed using molding, casting, or milling techniques known to those skilled in the art.

It will be appreciated that the structure and apparatus disclosed herein is merely one example of a means for providing a differential coefficient of friction, and it should be appreciated that any structure, apparatus or system for providing a differential coefficient of friction which performs functions the same as, or equivalent to, those disclosed herein are intended to fall within the scope of a means for providing a differential coefficient of friction, including those structures, apparatus or systems for providing a differential coefficient of friction which are presently known, or which may become available in the future. Anything which functions the same as, or equivalently to, a means for providing a differential coefficient of friction falls within the scope of this element.

It will be appreciated that the structure and apparatus disclosed herein is merely one example of a means for coating at least one of the spring bar and the bracket, and it should be appreciated that any structure, apparatus or system for coating at least one of the spring bar and the bracket which performs functions the same as, or equivalent to, those disclosed herein are intended to fall within the scope of a means for coating at least one of the spring bar and the bracket, including those structures, apparatus or systems for coating at least one of the spring bar and the bracket which are presently known, or which may become available in the future. Anything which functions the same as, or equivalently to, a means for coating at least one of the spring bar and the bracket falls within the scope of this element.

It will be appreciated that the structure and apparatus disclosed herein is merely one example of a means for allowing a metal to metal contact, and it should be appreciated that any structure, apparatus or system for allowing a metal to metal contact which performs functions the same as, or equivalent to, those disclosed herein are intended to fall within the scope of a means for allowing a metal to metal contact, including those structures, apparatus or systems for allowing a metal to metal contact which are presently known, or which may become available in the future. Anything which functions the same as, or equivalently to, a means for allowing a metal to metal contact falls within the scope of this element.

In accordance with the features and combinations described above, a useful method of towing a trailer may include the steps of:

attaching the trailer to a tow vehicle with a trailer hitch system, the trailer hitch system comprising a spring bar;

joining the spring bar to the trailer with a bracket;

providing a protective coating on at least one of the spring bar and the bracket;

providing a contact surface on the at least one of the spring bar and the bracket such that the contact surface allows metal to metal contact between the spring bar and the bracket.

In accordance with the features and combinations described above, another useful method of towing a trailer may include the steps of:

attaching the trailer to a tow vehicle with a trailer hitch system, the trailer hitch system comprising a hitch head and a spring bar having a pair of projections that are non-rotatable with respect to the spring bar;

rotatably joining the spring bar to the hitch head through the projections;

joining the spring bar to the trailer with a rigid bracket; and adjusting a height of the bracket with respect to the trailer.

Those having ordinary skill in the relevant art will appreciate the advantages provided by the features of the present disclosure. For example, it is a feature of the present disclosure to provide a trailer hitch system that is relatively simple in design and manufacture. Another feature of the present disclosure is to provide such a trailer hitch system that reduces trailer sway and equalizes loads. It is a further feature of the present disclosure, in accordance with one aspect thereof, to provide a trailer hitch system having brackets with contact surfaces having improved frictional characteristics. It is an additional feature of the present disclosure to provide a trailer hitch system having an aesthetically pleasing appearance. It is another feature of the present disclosure to provide a trunnion style trailer hitch having rigid brackets that reduce pendulum movement of spring bars. It is an additional feature of the present disclosure to provide a metal on metal contact surface between the spring bars and the rigid bracket. It is a further feature of the present disclosure to provide a trailer hitch that allows for improved maneuverability while turning the tow vehicle or backing the trailer.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description of the Disclosure by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A trailer hitch system comprising:

a spring bar for joining with a hitch head and exerting a force on said hitch head; and a bracket for joining said spring bar to a trailer;

wherein said bracket comprises a contact surface integral with said bracket, said contact surface forming part of a means for providing a differential coefficient of friction on said bracket;

wherein said means for providing a differential coefficient of friction further comprises a coating on said bracket, wherein said bracket comprises a support having an upward extending portion being adjustably attachable to said trailer, a lateral extending portion for receiving said spring bar thereupon, and a curved transition portion interposed between the upward extending portion and the lateral extending portion;

wherein said upward extending portion, said lateral extending portion and said curved transition portion are integrally interconnected;

wherein said contact surface is integrally part of said lateral extending portion of said support, said contact surface having an inner boundary and a outer boundary, wherein the inner boundary is spaced apart from said outer boundary;

wherein said coating extends along the upward extending portion and through the curved transition portion and along the lateral extending portion; and wherein said coating terminates at the inner boundary of the contact surface and resumes at the outer boundary of the contact surface such that said contact surface is characterized by an absence of said coating.

2. The trailer hitch system of claim 1, wherein said contact surface provides a metal to metal contact between said spring bar and said bracket.

3. The trailer hitch system of claim 1, further comprising a first projection on a first side of said spring bar, and a second projection on a second side of said spring bar.

4. The trailer hitch system of claim 3, wherein said first projection and said second projection are non-rotatably joined to said spring bar and configured for attaching said spring bar to said hitch head such that said spring bar is rotatable with respect to said hitch head.

5. The trailer hitch system of claim 1, wherein said bracket comprises an attachment portion for attaching the bracket to the trailer, and a support adjustably attachable to said attachment portion.

6. The trailer hitch system of claim 5, wherein said attachment portion comprises a receiver and said support comprises an upward extending portion slidably adjustable in said receiver and a lateral extending portion for supporting said spring bar thereupon.

7. The trailer hitch system of claim 6, wherein said upward extending portion comprises a plurality of openings for receiving a fastening member for adjustably attaching said support to said receiver.

8. A trailer hitch system comprising:

a spring bar for joining with a hitch head and exerting a force on said hitch head; and a bracket for joining said spring bar to a trailer, said bracket comprising a support;

wherein said support comprises a coating and a contact surface for contacting said spring bar providing a differential coefficient of friction on said bracket, wherein said contact surface is characterized by an absence of said coating;

wherein said support comprises an upward extending portion that is adjustably attachable to said trailer, and a lateral extending portion for receiving said spring bar thereupon;

wherein said contact surface is integrally formed on said lateral extending portion of said support;

wherein said upward extending portion, the lateral extending portion and the contact surface are of unitary construction.

9. The trailer hitch system of claim 8, wherein said contact surface covers less than 90% of a length of the lateral extending portion and more than 10% of the length of lateral extending portion.

10. The trailer hitch system of claim 9, wherein said contact surface covers less than 75% of the length of the lateral extending portion and more than 25% of the length of lateral extending portion.

11. The trailer hitch system of claim 8, wherein said contact surface provides a metal to metal contact between said spring bar and said bracket.

12. The trailer hitch system of claim 8, further comprising a first projection on a first side of said spring bar, and a second projection on a second side of said spring bar.

13. The trailer hitch system of claim 12, wherein said first projection and said second projection are non-rotatably joined to said spring bar and configured for attaching said spring bar to said hitch head such that said spring bar is rotatable with respect to said hitch head.

14. The trailer hitch system of claim 8, wherein said bracket comprises an attachment portion for attaching the bracket to the trailer, and a support adjustably attachable to said attachment portion.

15. The trailer hitch system of claim 14, wherein said attachment portion comprises a receiver and said support comprises an upward extending portion slidably adjustable in said receiver and a lateral extending portion for supporting said spring bar thereupon.

16. The trailer hitch system of claim 15, wherein said upward extending portion comprises a plurality of openings for receiving a fastening member for adjustably attaching said support to said receiver.

17. A trailer hitch system comprising:
a spring bar for joining with a hitch head and exerting a force on said hitch head; and
a bracket for joining said spring bar to a trailer, said bracket comprising a support having an upward extending portion being adjustably attachable to said trailer, and a lateral extending portion for receiving said spring bar thereupon, wherein said upward extending portion and said lateral extending portion are integrally constructed, wherein a first portion of said lateral extending portion has a first surface friction coefficient, and a second portion of said lateral extending portion has a second, different surface friction coefficient, wherein said second portion of said lateral extending portion is characterized by a coating, and wherein said first portion of said lateral extending portion is characterized by an absence of said coating, and wherein said first portion of said lateral extending portion is configured to contact said spring bar.

18. The trailer hitch system of claim 17, wherein said first surface friction coefficient is greater than said second surface friction coefficient.

19. The trailer hitch system of claim 17, further comprising a first projection on a first side of said spring bar, and a second projection on a second side of said spring bar.

20. The trailer hitch system of claim 19, wherein said first projection and said second projection are non-rotatably joined to said spring bar and configured for attaching said spring bar to said hitch head such that said spring bar is rotatable with respect to said hitch head.

21. The trailer hitch system of claim 17, wherein said support is rigid, and wherein said upward extending portion comprises a plurality of openings for receiving a fastening member for adjustably attaching said support to a receiver.

22. The trailer hitch system of claim 17, wherein said first portion covers less than 90% of a length of the lateral extending portion and more than 10% of the length of lateral extending portion.

23. A trailer hitch system comprising:
a spring bar for joining with a hitch head and exerting a force on said hitch head;
a bracket for joining said spring bar to a trailer;
wherein said bracket comprises a means for coating said bracket; and
wherein said bracket further comprises a means for allowing a metal to metal contact between said spring bar and said bracket, said means for allowing metal to metal contact comprising a contact surface on said bracket that is characterized by an absence of said means for coating providing a differential coefficient of friction on said bracket;
wherein said means for coating comprises one of paint, enamel, and powder.

24. The trailer hitch system of claim 23, wherein said bracket comprises a support having an upward extending portion being adjustably attachable to said trailer, and a lateral extending portion for receiving said spring bar thereupon.

25. The trailer hitch system of claim 24, wherein said upward extending portion comprises a plurality of openings for receiving a fastening member for adjustably attaching said support to a receiver.

26. The trailer hitch system of claim 24, wherein said bracket comprises a rigid support having an upward extending portion and a lateral extending portion.

27. The trailer hitch system of claim 23, wherein said bracket comprises an attachment portion for attaching the bracket to the trailer, and a support adjustably attachable to said attachment portion.

28. The trailer hitch system of claim 27, wherein said first projection and said second projection are non-rotatably joined to said spring bar and configured for attaching said spring bar to said hitch head such that said spring bar is rotatable with respect to said hitch head.

29. The trailer hitch system of claim 23, further comprising a first projection on a first side of said spring bar, and a second projection on a second side of said spring bar.

30. A trailer hitch system comprising:
a spring bar for joining with a hitch head and exerting a force on said hitch head;
a first projection on a first side of said spring bar, and a second projection on a second side of said spring bar, said first projection and said second projection being non-rotatably joined to said spring bar and configured for attaching said spring bar to said hitch head; and
a bracket for joining said spring bar to a trailer, said bracket comprising an attachment portion for attaching the bracket to a trailer, and a support adjustably attachable to said attachment portion, said support comprising an upward extending portion for attachment to said attachment portion and for being adjusted in an upward and downward direction with respect to said attachment portion, and a lateral extending portion joined to said upward extending portion for receiving said spring bar thereupon;
wherein said support comprises a coating and a contact surface for contacting said spring bar providing a differential coefficient of friction on said bracket, wherein said contact surface is characterized by an absence of said coating;

wherein said support and contact surface are of unitary construction.

31. The trailer hitch system of claim 30, wherein said contact surface is formed on said lateral extending portion of said support.

32. The trailer hitch system of claim 31, wherein said contact surface covers less than 90% of a length of the lateral extending portion and more than 10% of the length of lateral extending portion.

33. The trailer hitch system of claim 30, wherein said contact surface provides a metal to metal contact between said spring bar and said bracket.

34. The trailer hitch system of claim 30, wherein said attachment portion comprises a receiver and said support is slidably adjustable in said receiver.

35. The trailer hitch system of claim 34, wherein said upward extending portion comprises a plurality of openings for receiving a fastening member for adjustably attaching said support to said receiver.

36. The trailer hitch system of claim 30, wherein at least one of said spring bar and said support comprises a coating and a contact surface for contacting the other of said spring bar and said support, wherein said contact surface is characterized by an absence of said coating;
wherein said spring bar has a higher coefficient of friction at said contact surface than at other locations on said spring bar;
wherein said contact surface is formed on said lateral extending portion of said support;
wherein said contact surface covers less than 75% of a length of the lateral extending portion and more than 25% of the length of lateral extending portion;
wherein said contact surface provides a metal to metal contact between said spring bar and said bracket;
wherein said attachment portion comprises a receiver and said support is slidably adjustable in said receiver;
wherein said upward extending portion comprises a plurality of openings for receiving a fastening member for adjustably attaching said support to said receiver;
wherein said support comprises a rigid member;
wherein said lateral extending portion comprises an opening for receiving a stud for holding said spring bar on said lateral extending portion;
wherein said spring bar is rotatable with respect to said hitch head;
wherein said spring bar comprises one of a group consisting of a polygonal cross-sectional shape and a round cross-sectional shape;
wherein said spring bar comprises one of a group consisting of a constant cross-sectional shape and a tapered cross-sectional shape along a length of said spring bar.

37. A trailer hitch system comprising:
a spring bar for joining with a hitch head and exerting a force on said hitch head;
a first projection on a first side of said spring bar, and a second projection on a second side of said spring bar, said first projection and said second projection being non-rotatably joined to said spring bar and configured for attaching said spring bar to said hitch head; and
a bracket for joining said spring bar to a trailer, said bracket comprising a rigid support having an upward extending portion slidably adjustable in a receiver and a lateral extending portion for supporting said spring bar thereupon;
wherein said upward extending portion comprises a plurality of openings for receiving a fastening member for adjustably attaching said support to said receiver;
wherein said bracket comprises a coating on said bracket;
wherein said bracket comprises a contact surface for contacting said spring bar providing a differential coefficient of friction on said bracket; and
wherein contact surface is characterized by an absence of said coating;
wherein said upward extending portion, said lateral extending portion and said contact surface are unitary.

38. The trailer hitch system of claim 37, wherein said contact surface is integral with said at least one of said spring bar and said bracket.

39. The trailer hitch system of claim 37, wherein said contact surface is formed on said lateral extending portion of said support.

40. The trailer hitch system of claim 37, wherein said contact surface provides a metal to metal contact between said spring bar and said bracket.

41. The trailer hitch system of claim 37, wherein said bracket comprises an attachment portion for attaching the bracket to the trailer, and said support is adjustably attachable to said attachment portion.

42. A method of preparing a trailer for towing, said method comprising:
attaching said trailer to a tow vehicle with a trailer hitch system, said trailer hitch system comprising:
a spring bar;
a bracket;
a protective coating on said bracket; and
a contact surface on said bracket such that said contact surface allows metal to metal contact between said spring bar and said bracket said contact surface providing a differential coefficient of friction on said bracket;
wherein said bracket and contact surface are of unitary construction.

43. The method of claim 42, wherein said trailer hitch system comprises a hitch head and said spring bar comprises a pair of projections, said method further comprising rotatably joining said spring bar to said hitch head through said projections.

44. The method of claim 42, further comprising joining said spring bar to said trailer with a rigid bracket.

45. The method of claim 42, further comprising adjusting a height of said bracket with respect to said trailer.

46. The method of claim 42, further comprising holding said spring bar on said bracket.

47. The method of claim 42, further comprising allowing said spring bar to move with respect to said bracket such that said bracket contacts said spring bar along a length of said spring bar.

48. A method of preparing a trailer for towing, said method comprising:
attaching said trailer to a tow vehicle with a trailer hitch system, said trailer hitch system comprising:
a spring bar;
a bracket;
a contact surface on said bracket;
a coating on said bracket; and
an opening in said coating over said bracket at said contact surface such that said contact surface is free from said coating providing a differential coefficient of friction on said bracket;
wherein said bracket and contact surface are of unitary construction.

49. The method of claim 48, further comprising providing a metal to metal contact between said spring bar and said bracket.

50. The method of claim 48, further comprising adjusting a height of said bracket with respect to said trailer.

51. The method of claim 48, further comprising joining said spring bar to said trailer with a rigid bracket.

52. The method of claim 48, wherein said trailer hitch system comprises a hitch head and said spring bar comprising a pair of projections that are non-rotatable with respect to the spring bar, said method further comprising rotatably joining said spring bar to said hitch head through said projections.

53. The method of claim 48, further comprising holding said spring bar on said bracket.

54. The method of claim 48, further comprising allowing said spring bar to move with respect to said bracket such that said bracket contacts said spring bar along a length of said spring bar.

55. The method of claim 48, further comprising preventing said spring bar from swinging with respect to said trailer.

56. A method of towing a trailer, said method comprising:
attaching said trailer to a tow vehicle with a trailer hitch system, said trailer hitch system comprising a hitch head and a spring bar having a pair of projections that are non-rotatable with respect to the spring bar;
rotatably joining said spring bar to said hitch head through said projections;
joining said spring bar to said trailer with a rigid bracket;
adjusting a height of said bracket with respect to said trailer;
defining a contact surface on said bracket;
forming said contact surface by placing a covering over said bracket at said contact surface;
applying a coating on said bracket, and removing said covering such that said contact surface is free from said coating providing a differential coefficient of friction on said bracket; and
providing a metal to metal contact between said spring bar and said bracket;
wherein said bracket and contact surface are integrally connected.

57. The method of claim 56, further comprising holding said spring bar on said bracket.

58. The method of claim 56, further comprising allowing said spring bar to move with respect to said bracket such that said bracket contacts said spring bar along a length of said spring bar.

59. The method of claim 56, further comprising preventing said spring bar from swinging with respect to said trailer.

60. The method of claim 56, further comprising joining said bracket to said trailer such that a portion of said bracket is fixed with respect to said trailer.

61. The method of claim 60, further comprising joining said bracket to said trailer such that a portion of said bracket is adjustable with respect to said trailer in an upward and downward direction.

62. The method of claim 56, further comprising moving a support through a receiver to adjust said height of said bracket with respect to said trailer.

63. A trailer hitch system comprising:
a spring bar for joining with a hitch head and exerting a force on said hitch head; and
a bracket for joining said spring bar to a trailer;
wherein said bracket comprises an attachment portion having a tab for attaching the bracket to the trailer, and a support adjustably attachable to said attachment portion;
wherein said bracket comprises a contact surface for contacting said spring bar, said bracket is characterized by a coating on said bracket, and wherein said contact surface is characterized by an absence of said coating providing a differential coefficient of friction on said bracket;
wherein said support and said contact surface are of unitary construction.

64. A method of making a trailer hitch, said method comprising:
providing spring bar;
joining said spring bar to a trailer with a bracket;
providing a protective coating on said bracket; and
providing a contact surface on said bracket such that said contact surface allows metal to metal contact between said spring bar and said bracket said contact surface providing a differential coefficient of friction on said bracket;
wherein said contact surface and said bracket are of unitary construction.

65. The method of claim 64, further comprising forming said contact surface by placing a covering over said bracket at said contact surface.

66. The method of claim 65, further comprising applying said coating on said bracket, and removing said covering such that said contact surface is free from said coating.

67. The method of claim 64, wherein said trailer hitch system comprises a hitch head and said spring bar comprises a pair of projections, said method further comprising rotatably joining said spring bar to said hitch head through said projections.

68. The method of claim 64, further comprising joining said spring bar to said trailer with a rigid bracket.

69. The method of claim 64, further comprising adjusting a height of said bracket with respect to said trailer.

70. The method of claim 64, further comprising holding said spring bar on said bracket.

71. The method of claim 64, further comprising allowing said spring bar to move with respect to said bracket such that said bracket contacts said spring bar along a length of said spring bar.

72. A method of making a trailer hitch, said method comprising:
providing a spring bar;
providing a bracket;
providing a contact surface on said bracket;
providing coating on said bracket; and
forming an opening in said coating over said bracket at said contact surface such that said contact surface is free from said coating providing a differential coefficient of friction on said bracket;
wherein said bracket and said contact surface are of unitary construction.

73. The method of claim 72, further comprising providing a metal to metal contact between said spring bar and said bracket.

74. The method of claim 72, further comprising adjusting a height of said bracket with respect to said trailer.

75. The method of claim 72, further comprising joining said spring bar to said trailer with a rigid bracket.

76. The method of claim 72, wherein said trailer hitch system comprises a hitch head and said spring bar comprising a pair of projections that are non-rotatable with respect to the spring bar, said method further comprising rotatably joining said spring bar to said hitch head through said projections.

77. The method of claim 72, further comprising holding said spring bar on said bracket.

78. The method of claim 72, further comprising allowing said spring bar to move with respect to said bracket such that said bracket contacts said spring bar along a length of said spring bar.

79. The method of claim 72, further comprising preventing said spring bar from swinging with respect to said trailer.

80. A trailer hitch system comprising:
- a spring bar for joining with a hitch head and exerting a force on said hitch head; and
- a bracket for joining said spring bar to a trailer;
- wherein said bracket comprises a contact surface integral with said bracket, said contact surface forming part of a means for providing a differential coefficient of friction on said bracket;
- wherein said means for providing a differential coefficient of friction further comprises a coating on said bracket, wherein said coating does not constitute a pad or other non-coating structural projection; and
- wherein said contact surface is characterized by an absence of said coating.

\* \* \* \* \*